(12) United States Patent
Cho et al.

(10) Patent No.: US 10,606,237 B2
(45) Date of Patent: Mar. 31, 2020

(54) WELDING DEVICE

(71) Applicants: CHANGWON NATIONAL UNIVERSITY Industry Academy Cooperation Corps, Changwon-si, Gyeongsangnam-do (KR); BEST F.A CO., LTD., Changwon-si, Gyeongsangnam-do (KR)

(72) Inventors: Young Tae Cho, Daejeon (KR); Yu Chan Kim, Changwon-si (KR); Yoon Gyo Jung, Changnyeong-gun (KR); Young Cheol Jeong, Changwon-si (KR)

(73) Assignees: Changwon National University Industry Academy Cooperation Corps, Gyeongsangnom-do (KR); Best F.A. Co., Ltd., Gyeongsangnam-do (KR)

( * ) Notice: Subject to any disclaimer, the term of this patent is extended or adjusted under 35 U.S.C. 154(b) by 0 days.

(21) Appl. No.: 15/760,821

(22) PCT Filed: Apr. 29, 2016

(86) PCT No.: PCT/KR2016/004506
§ 371 (c)(1),
(2) Date: Mar. 16, 2018

(87) PCT Pub. No.: WO2017/047899
PCT Pub. Date: Mar. 23, 2017

(65) Prior Publication Data
US 2018/0373222 A1      Dec. 27, 2018

(30) Foreign Application Priority Data
Sep. 16, 2015 (KR) .................. 10-2015-0130691

(51) Int. Cl.
B23K 9/173 (2006.01)
B23K 9/32 (2006.01)
(Continued)

(52) U.S. Cl.
CPC .......... *G05B 19/402* (2013.01); *B23K 9/0953* (2013.01); *B23K 9/0956* (2013.01);
(Continued)

(58) Field of Classification Search
None
See application file for complete search history.

(56) References Cited

U.S. PATENT DOCUMENTS 4,831,233 A * 5/1989 Gordon ................. B23K 9/095
219/124.34
5,708,253 A * 1/1998 Bloch ................... B23K 9/0953
219/130.01

FOREIGN PATENT DOCUMENTS

JP      2002-224914 A      8/2002
JP      2003-088969 A      3/2003
(Continued)

OTHER PUBLICATIONS

Nagarajan, "Infrared Sensing for Adaptive Arc Welding", Nov. 1989, Welding Research Supplement, pp. 462-463 (Year: 1989).*
(Continued)

*Primary Examiner* — Mohammad Ali
*Assistant Examiner* — David Earl Ogg
(74) *Attorney, Agent, or Firm* — Harness, Dickey Pierce, P.L.C.

(57) ABSTRACT

The present invention relates to a welding device which includes a welding power source provided with a power supply circuit; a wire feeder connected to the welding power supply to supply wire; a torch which pulls the wire supplied from the wire feeder and supplies the wire to a welding part;
(Continued)

an IR thermal camera which captures the welding part; a vision module having built-in program which receives and processes a captured image of a IR thermal camera; and a slag removal device which removes slag detected in the welding part in real time in conjunction with the vision module. The welding device has an effect in which slag generated during welding can be removed before the slag is fixed on the molten pool.

6 Claims, 5 Drawing Sheets

(51) Int. Cl.
    *B23K 37/08*     (2006.01)
    *B23K 9/095*     (2006.01)
    *B23K 9/12*     (2006.01)
    *B23K 9/29*     (2006.01)
    *B23K 31/12*     (2006.01)
    *G05B 19/402*     (2006.01)

(52) U.S. Cl.
    CPC ................ *B23K 9/12* (2013.01); *B23K 9/173* (2013.01); *B23K 9/291* (2013.01); *B23K 9/32* (2013.01); *B23K 31/125* (2013.01); *B23K 37/08* (2013.01); *G05B 2219/45135* (2013.01)

(56) References Cited

FOREIGN PATENT DOCUMENTS

| KR | 10-0135028 | | 6/1998 |
|---|---|---|---|
| KR | 2001-0010427 | A | 2/2001 |
| KR | 10-0810878 | B1 | 3/2008 |
| KR | 2012-0020468 | A | 3/2012 |
| KR | 20120020468 | * | 3/2012 |

OTHER PUBLICATIONS

Nele, "An image acquisition system for real-time seam tracking", 2013, Int J Adv Manuf (2013) 69:2099-2110, pp. 2099-2109 (Year: 2013).*

2015 Spring Conference Presentation Materials of Korean Welding and Joining Society (Study on the Welding Slag Behavior by Infrared Camera), Published Date: May 7, 2015.

International Conference on High Strength Materials—Challenges and Applications, 68th IIW Annual Assembly & International Conference Materials (Real Time Monitoring System for Slag Generation in Arc Welding Using an Infrared Camera) Published Date: Jul. 2, 2015.

International Search Report PCT/ISA/210 for International Application No. PCT/KR2016/004506 dated Aug. 19, 2016.

* cited by examiner

[FIG. 1]
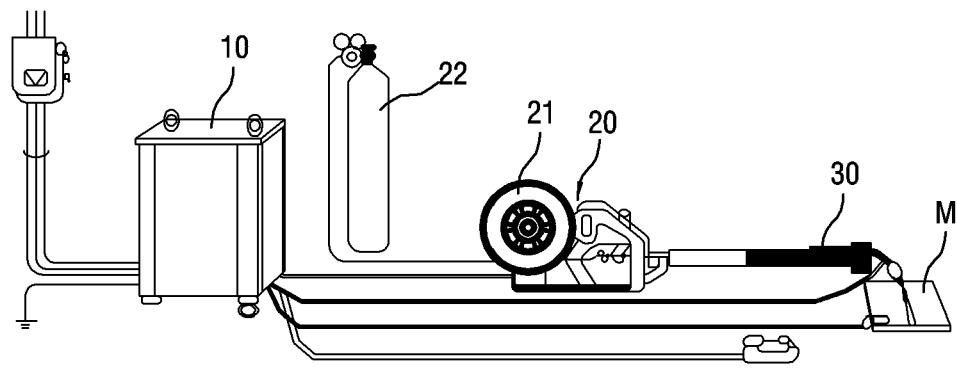
[FIG. 2]
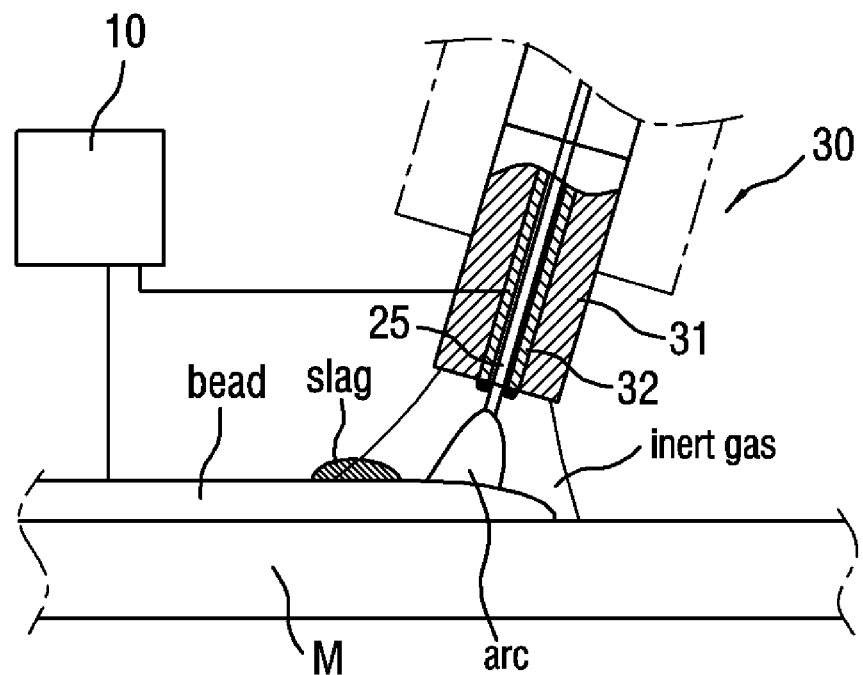

[FIG. 3]
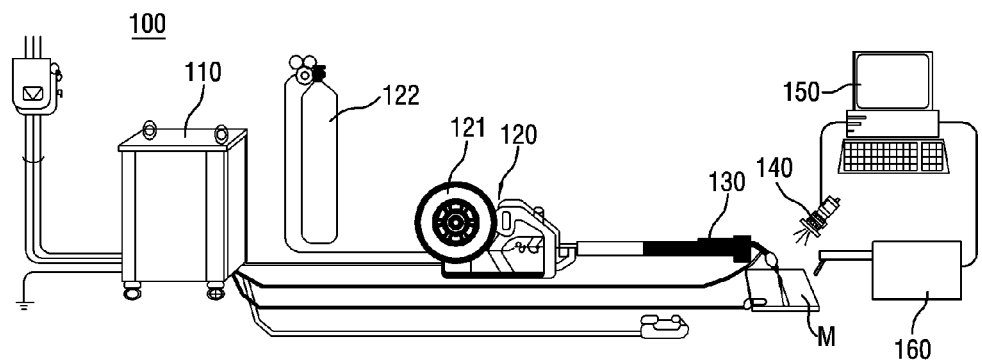
[FIG. 4]
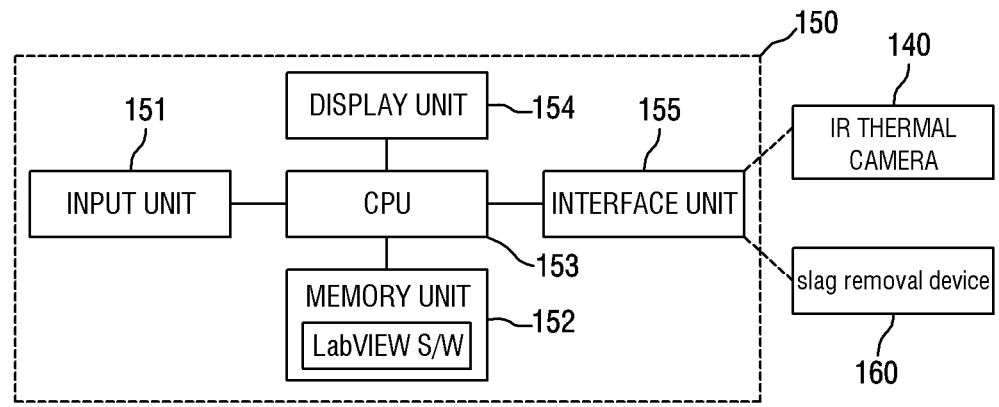

[FIG. 5]
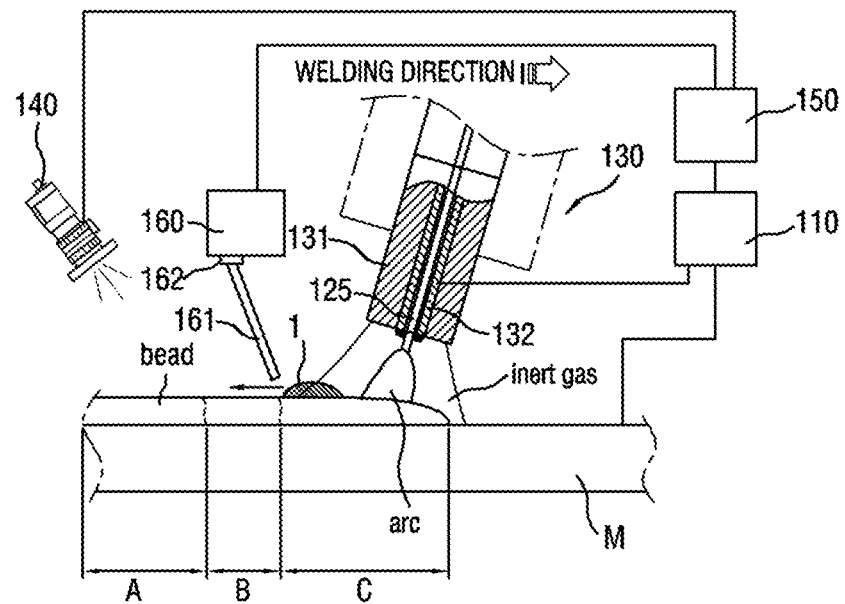
[FIG. 6]
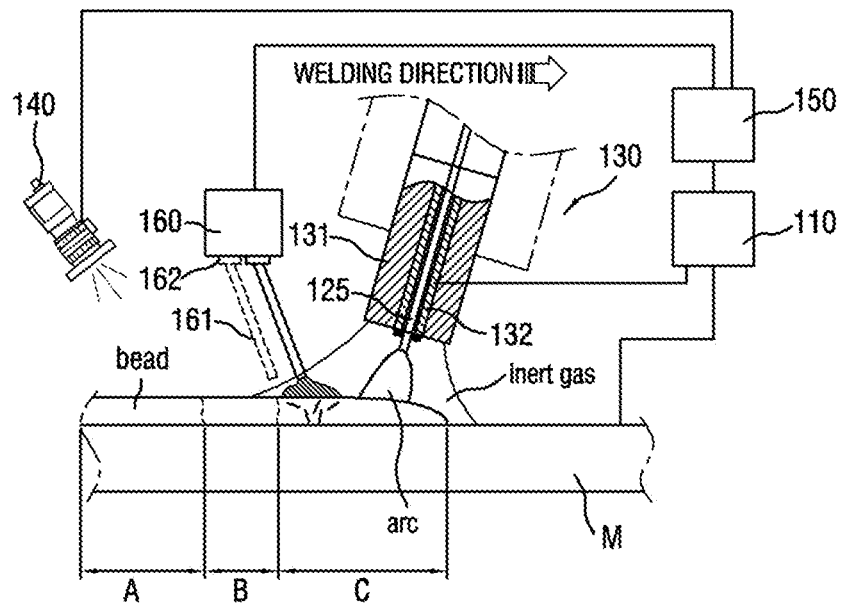

[FIG. 7]
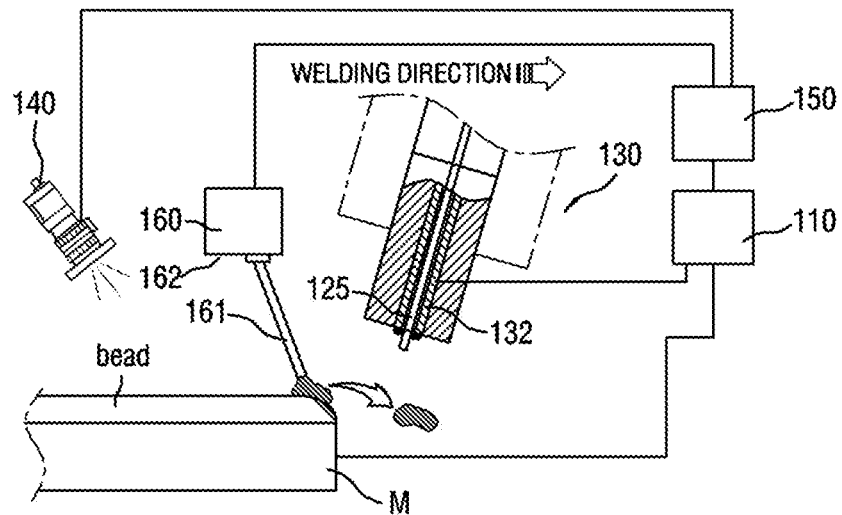
[FIG. 8]
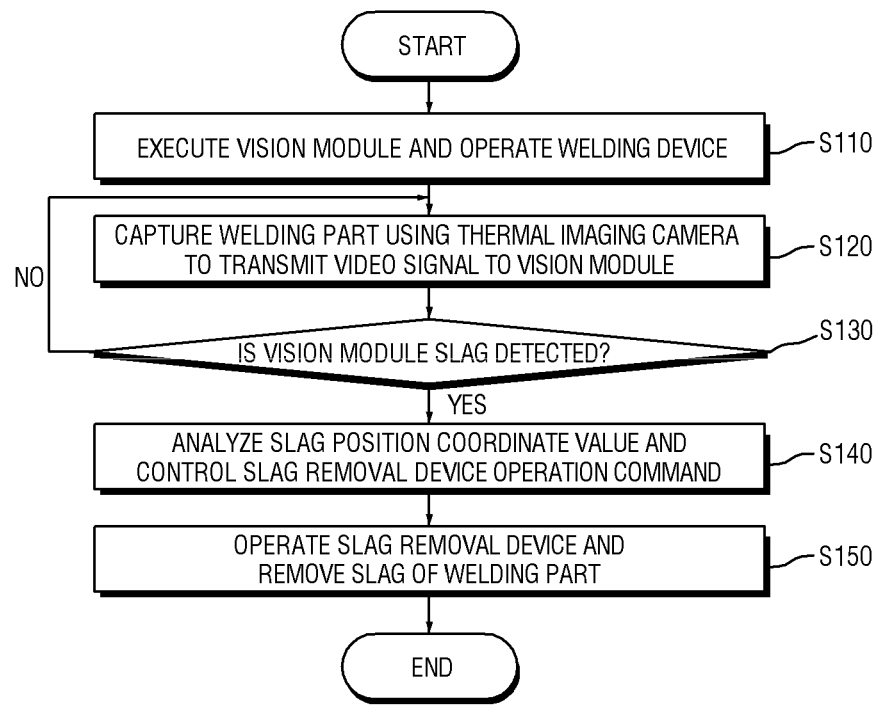

[FIG. 9]
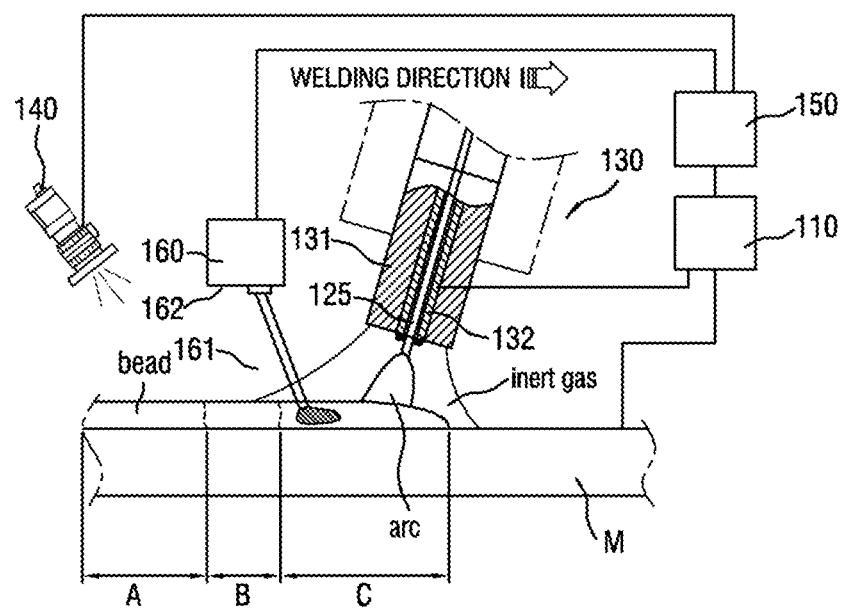

WELDING DEVICE

CROSS-REFERENCE TO RELATED APPLICATIONS

This application is a national phase under 35 U.S.C. § 371 of PCT International Application No. PCT/KR2016/004506 which has an International filing date of Apr. 29, 2016, which claims priority to Korean Application No. 10-2015-0130691, filed Sep. 16, 2015, the entire contents of each of which are hereby incorporated by reference.

FIELD

The present invention relates to a welding device, and more particularly, to a welding device capable of monitoring and removing fixed type non-metallic slag generated during welding of a MIG welding device in real time.

BACKGROUND

In general, arc welding is one of welding methods for generating an electric arc and melting a base material using the electric arc as a heat source to perform welding, and the types thereof are very diverse.

Among them, an inert gas arc welding is a method for performing welding, while supplying the inert gas to a welding part from a torch. In order to weld a special welding part in a state of being isolated from the air. Argon (Ar), helium (He), or the like which is not affected by nitrogen or oxygen in atmosphere and does not react with metal even at a high temperature is used as the inert gas, and a tungsten rod or a metal rod is used as an electrode.

Such an inert gas arc welding method is also referred to as a shield arc welding, and is classified into two types of a method using a heat source of a tungsten arc in an inert gas atmosphere and a method using a heat source of a metal arc. That is, there are a non-consumable type which is not melted and a consumable type which is melt depending on the electrode used as a heat source.

Here, since the non-consumable type uses a tungsten electrode rode, the non-consumable type is called a shielded inert gas tungsten arc welding or a TIG welding method. Further, since the consumable type uses a long core wire filler metal, the consumable type is called an inert gas arc welding method or a MIG welding method.

The above-mentioned MIG welding continuously supplies the consumption electrode wire substantially the same material as the base metal and melts the electrode wire and the base material by arc heat generated between the base metal and the welding wire in the inert gas to join the metal. The MIG welding commonly uses a DC welding power supply and performs using reverse polarity (welding rod +, base material −).

On the other hand, at the time of welding, while beads are generated at the welding part between the base materials, slag can be covered on the beads. Since the slag covered with the welding bead corresponds to welding defect, the slag needs to be removed immediately after welding.

Since the MIG welding has a higher melting speed and solidification speed than other welding methods, there is no time margin in which gas and impurities float, and an occurrence rate of sputtering or welding slag is small. However, there is an inconvenience in which the fixed type slag generated once is classified as a defect and the slag needs to be removed manually after visually checked by an operator in a subsequent treatment process.

Therefore, conventionally, in order to read the slag which is the defect of the welding part, after visually checking the resulting product after welding, when the slag covered by the welding bead is checked, the slag is removed manually with another impact tool, which hinders the automation of the welding process. Also, manpower is wasted and the production efficiency drops for the slag readings and removal, and slugs that have already solidified may not be broken often. Thus, there was problem of discard of product due to defects in welding products or cracks.

Therefore, there is a need for a welding device capable of preventing welding failure due to slag generation and performing the stable welding without stopping welding, monitoring slag generated at the time of welding in real time and removing the slag.

SUMMARY

The present invention has been made to solve the above problems, and an object of the present invention is to provide a welding device capable of performing the stable welding without stopping welding, monitoring slag generated at the time of welding in real time and removing the slag.

The objects of the present invention are not limited to those mentioned above, and another object not mentioned may be clearly understood by those skilled in the art from the description below.

To solve the aforementioned object, according to an aspect of the present invention, there is provided a welding device which includes a welding power source provided with a power supply circuit; a wire feeder connected to the welding power supply to supply wire; a torch which pulls the wire supplied from the wire feeder and supplies the wire to a welding part; an IR thermal camera which captures the welding part; a vision module having built-in program which receives and processes a captured image of a IR thermal camera; and a slag removal device which removes slag detected in the welding part in real time in conjunction with the vision module.

Further, the present invention provides the welding device in which the vision module includes an input unit for inputting operator's instructions and data on the basis of a PC having a built-in LabVIEW® ("LabVIEW") program; a memory unit which performs LabVIEW programming of an automation control algorithm created by the input unit and stores the automation control algorithm; a CPU which receives a video signal captured by the IR thermal camera and executes a vision process by a defined algorithm; a display unit which visually checks a procedure of creating and executing the automation control algorithm using the LabVIEW program; and an interface unit which is connected to the IR thermal camera and the slag removal device to transmit a video signal and a control signal.

Further, the present invention provides the welding device in which the slag removal device includes a slag removal wire; and a transfer unit which transfers the slag removal wire, and the transfer unit adjusts an angle and a position of the slag removal wire.

Further, the present invention provides the welding device in which the torch includes a nozzle in which a flow rate of welding protective gas is controlled by the vision module.

The welding device according to the present invention as described above has the effect capable of performing the stable welding without interrupting welding, monitoring the slag generated at the time of welding in real time and remove the slag.

Further, according to the present invention, there is an effect of automating reading and removal of slag, reducing welding failure due to slag adhesion in the welding process and enhancing productivity.

BRIEF DESCRIPTION OF THE DRAWINGS

The above and other aspects and features of the present invention will become more apparent by describing in detail exemplary embodiments thereof with reference to the attached drawings, in which:

FIG. 1 is a diagram schematically illustrating a conventional MIG welding device;

FIG. 2 is an enlarged partial cross-sectional view illustrating a torch leading end portion in the MIG welding device;

FIG. 3 is a diagram schematically illustrating the welding device of the present invention;

FIG. 4 is a block diagram illustrating a configuration of a vision module of the present invention;

FIGS. 5 to 7 are diagrams schematically illustrating a slag removal step of the welding device according to the present invention;

FIG. 8 is a flowchart illustrating a step of slag detection and removal according to the welding device of the present invention; and FIG. 9 is a diagram illustrating another embodiment of FIG. 5.

DETAILED DESCRIPTION OF THE INVENTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

Specific contents for carrying out the present invention will be described in detail with reference to the accompanying drawings. Regardless of the drawings, the same reference numerals refer to the same elements, and the term "and/or" includes each of the mentioned items and one or more combinations.

Although the terms "first, second, and the like" are used to describe various constituent elements, these constituent elements are, of course, not limited by these terms. These terms are merely used to distinguish one constituent element from other constituent elements. Therefore, it is a matter of course that the first constituent element described below may be a second constituent element within the technical idea of the present invention.

The terms used in the present specification are for the purpose of illustrating the examples and do not limit the present invention. As used herein, the singular form also includes the plural forms unless specifically stated in a phrase. The terms "comprises" and/or "comprising" used in the specification do not exclude the presence or addition of one or more other constituent elements in addition to the referenced constituent elements.

Unless otherwise defined, all terms (including technical and scientific terms) used in this specification may be used in the meaning that can be understood in common by those having ordinary skill in the technical field to which the present utility model belongs.

Also, commonly used predefined terms are not interpreted ideally or unduly unless expressly defined otherwise.

Spatially relative terms "below", "beneath", "lower", "above", "upper" and the like may be used to easily describe the correlation between one constituent element and another constituent element as illustrated in the drawings. Spatially relative terms should be understood as terms including different directions of constituent elements during use or operation in addition to the directions illustrated in the drawings. For example, when reversing the constituent elements illustrated in the drawings, the constituent elements described as "below" or "beneath" of another constituent element may be placed "above" another constituent element. Thus, the exemplary term "below" may include both downward and upward directions. The constituent elements may also be oriented in other directions, and thus, the spatially relative terms can be interpreted by orientation.

Hereinafter, preferred embodiments of the present invention will be described in detail with reference to the attached drawings.

FIG. 1 is a diagram schematically illustrating a typical MIG welding device.

FIG. 2 is a partial cutaway sectional view illustrating a torch leading end portion in a general MIG welding device in an enlarged manner.

A typical MIG welding device is configured to include a torch 30, a wire feeder 20, a power supply device 10 and the like.

One electrode of the power supply device 10 is connected to a base material M by a welding cable, and the other electrode is connected to a welding tip 32 provided at a leading end of the torch 30 to apply electricity to a wire 25 passing through the center of the welding tip 32. At this time, the wire 25 functions not only as a filler in the welding circuit but also as an electrode forming a welding circuit. That is, the torch 30 may generate an arc between the base material M and the wire 25 by applying electricity to the wire 25, while using an inert gas as a protective gas. At this time, the wire 25 made of the same material as the base material M is alloyed, while filling the melted part, thereby performing welding.

Further, the wire 25 is continuously supplied to the interior of the torch 30 by a wire feeder 20 including a wire spool 21, a feed motor, a roller and the like. A nozzle 31 is formed at the leading end of the torch 30, the welding tip 32 is built at the center of the nozzle 31, and the wire 25 is transferred to the center of the welding tip 32.

There are advantages that the above-mentioned MIG welding can be applied to most metals, welding can be performed in a wide range, and an appearance of a clean bead can be obtained as compared to other welding methods. Thus, the MIG welding is constantly used in industrial fields having the constant working condition and requiring large amounts of continuous welding, such as a vehicle body panel and a ship. In order to improve the productivity of welding, it is effective to automate the supply of the material and the movement of the welding direction in terms of the degree of welding completion, cost, and speed.

On the other hand, as described above, the bead-like fixed type non-metallic slag containing components such as FeO, $SiO_2$, and MnO generated during the welding process becomes a factor that hinders the automation of welding. Although the above-described MIG welding has a smaller incidence of slag compared to other welding methods, the reason is that the fixed type slag generated once is classified as a defect, and after it is visually checked by an operator in the subsequent treatment process, the fixed type slag should be manually removed.

Therefore, conventionally, in order to read the slag which is the defect of the welding part, after visually checking the result after the welding, when the slag covered by the welding bead is checked, the slag is removed manually with another impact tool. Thus, the manpower and time are wasted, which hinders the automation of the welding process. Also, since the slag reading and removal procedures are performed, production efficiency drops, and slugs that have already solidified may not be broken often. Thus, there was problem of discard of product due to defects in welding products or cracks.

Therefore, the present invention provides a welding device capable of performing the stable welding without stopping the automatic welding, monitoring slag generated at the time of welding in real time and immediately removing the slag after detecting the slag. In the welding device according to the present invention, the detection and removal of slag can be automated, welding failure due to slag adhesion can be reduced in the welding process, and productivity can be improved.

FIG. 3 is a diagram schematically illustrating the welding device of the present invention.

As illustrated in FIG. 3, a welding device 100 according to the present invention includes a welding power source 110 equipped with a power source circuit; a wire feeder 120 connected to the welding power source to supply a wire 125; a torch 130 which pulls the wire 125 supplied from the wire feeder and supplies the wire 125 to the welding part; an IR thermal camera 140 which photographs the welding part; a vision module 150 which incorporates a program for receiving and processing a captured image of the IR thermal camera; and slag removal device 160 which removes the slag detected by the welding part in real time in conjunction with the vision module.

At this time, in the embodiment of the present invention, in order to read the slag which is a welding defect, the fact that the infrared energy emitted from the nonmetallic fixed type slag generated at the time of welding is lower than that of the metal molten pool is utilized. That is, when the welding part is captured via the IR thermal camera 140, since the infrared energy is differently generated depending on the physical property value of the welding part, and the generated nonmetallic fixed type slag has lower temperature than the peripheral melting metal, it is possible to detect whether or not slag is generated from the isothermal line of the temperature data.

Subsequently, the IR thermal camera 140 transmits an image captured by detecting the infrared temperature of the welding part to the vision module 150. At this time, the vision module 150 reads the presence or absence of slag and the position coordinate value on the basis of the acquired video signal.

At this time, as the vision module 150, a machine vision system is applied which can combine video technologies, measure three-dimensional physical quantities, and apply them to automation. In general, a well-known machine vision system is a technique which images a product with a visible ray camera, transfers it to a computer instead of an inaccurate person's eye at an industrial site, and analyzes it with vision software to visually distinguish defects of products.

However, in the conventional machine vision system, collection and analysis of image data, defect reading, and the like are limited to products for which processes such as welding have been completed, and even if the system is applied to a MIG welding device, it is only used for reading and selecting defects such as slag generated in the welding process, and there is still a problem in which if the welding part is completely cooled down, removal of the already fixed slag should be carried out individually through.

On the other hand, in the vision module 150 applied to the welding device of the present invention, by receiving and analyzing the image obtained by continuously imaging the welding process using the IR thermal camera 140 in real time from the start to the end point of welding, it is possible to immediately detect slag generated during welding process. Further, in order to remove the slag, in the present invention, a slag removal device 160 which removes slag detected in the welding process in real time in conjunction with the program of the vision module 150 for detecting occurrence of the slag may be further included.

In the slag removal device 160, as soon as slag occurs in the welding process, the vision module 150 detects the slag and analyzes the position coordinate value of the slag, commands the slag removal device to operate so that the slag can be removed before completely melded to the welding part.

To this end, the vision module 150 is based on a control PC with a built-in program, acquires the image captured by the IR thermal camera 140 by the built-in program to perform the vision processing thereof, and detects the presence or absence and position of slag of the welding part accordingly to control the operation of the slag removal device 160.

At this time, the program built in the vision module 150 may include LabVIEW which is a graphical programming language to receive and analyze captured images of the IR thermal camera 140.

The LabVIEW program is a control measurement language manufactured by National Instruments Inc. It can be configured to view actual device on a computer and is also called a virtual instrument. Further, since it is programmed to make diagram unlike text-based programming languages such as basic or C-language, it is also called graphics programming language. In the above-described LabVIEW program, the order of programming progression includes various functions so as to control various devices according to the flow of data and process the data sent from the devices. Therefore, it is possible to easily provide the vision process and the automatic control of the automated facility by detecting the determination of defects caused by slag generation in the welding process in real time.

However, in the present invention, the program of the vision module 150 is not limited to LabVIEW S/W.

Subsequently, the vision module 150 may execute vision processing for images captured by the IR thermal camera 140 via a LabVIEW program, and may control the slag removal device 160 when the slag occurrence is detected. Further, the vision module 150 is configured on the basis of PC so that algorithms defined by operators are saved to control these series of operations by automation.

Therefore, before starting the welding process, the operator activates the vision module 150 to execute the LabVIEW program, inputs the operator's command and data to the vision module by the LabVIEW program, and may automatically perform monitoring of the welding part and slag removal in accordance with the defined algorithm.

FIG. 4 is a block diagram illustrating the configuration of the vision module according to the present invention.

The vision module 150 according to the embodiment of the present invention may include an input unit 151 for inputting operator's instructions and data on the basis of a PC incorporating the LabVIEW program; a memory unit 152 which performs LabVIEW programming of an automation control algorithm created by the input unit and stores the automation control algorithm; a CPU 153 which receives a video signal captured by the IR thermal camera 140 and executes a vision process by a defined algorithm; a display unit 154 which visually checks the procedure of creating and executing the automation control algorithm using the LabVIEW program; and an interface unit 155 which is connected to the IR thermal camera 140 and the slag removal device 160 to transmit a video signal and a control signal.

At this time, the LabVIEW program may be configured to include an automation control algorithm that acquires the video signal received from the IR thermal camera 140 and detects whether a slag occurs and reads the slag occurrence position, controls the slag removal device 160, transmits the coordinate values of the read slag position to control the position of the slang removal device and remove the slag.

Subsequently, the configuration and operation of the welding device 100 according to the present invention will be described more specifically.

FIGS. 5 to 7 are diagrams schematically illustrating the slag removal step of the welding device according to the present invention Referring to FIGS. 3 and 5, in a welding device 100 constructed in accordance with the present invention, electrical contact with the wire 125 occurs at the end portion of the welding tip 132, and the welding is performed, while the wire is consumed at the welding part through the heat received from arc and the heat received while energizing the current from the welding tip 132 to the leading end portion melted.

The torch 130 plays a role of applying electricity to the wire 125, while using an inert gas as a protective gas, and the torch 130 is connected to the gas container 122 to eject an inert gas such as helium or argon gas.

In the front inside of the torch 130, a wire 125 is provided to penetrate at the center of the torch 130, a welding tip 132 is covered on the outside of the wire 125, and a nozzle 131 is covered on the outside of the welding tip 132. The wire 125 is also provided to penetrate at the center in the rear inside of the torch 130, and the nozzle 131 is covered on the outside of the wire 125.

Further, a wire feeder 120 is installed behind the torch 130 so that the wire 125 can be continuously supplied to the interior of the torch 130. In the wire feeder 120, the wire 125 is wound around the wire spool 121, and the wire 125 is supplied to the torch 130 by pushing or pulling the wire 125 using a roller (not shown) driven by a feed motor (not shown). At this time, the wire feeder 120 may selectively apply one of a push type, a pull type or a push-pull type, depending on the feeding method.

A welding power supply 110 is connected to the welding tip 132 and the base material M to apply electricity to the wire 125. That is, one electrode of the welding power source 110 is connected to the base material M, and the other electrode of the welding power source 110 is connected to the welding tip 132.

Further, the IR thermal camera 140 and the slag removal device 160 can be located to be spaced apart from the welding part of the base material M at a certain interval. At this time, the IR thermal camera 140, the slag removal device 160 and the welding power supply 110 are connected to the interface unit of the vision module 150, respectively, receive and transmit electric signals, and are controlled by the vision module.

Next, a process in which the IR thermal camera 140 and the slag removal device 160 are controlled by the vision module 150 in the welding device of the present invention will be described.

FIG. 8 is a flowchart illustrating a detection and removal step of slag according to the welding device of the present invention.

In the process of detecting and removing the slag of the welding part, first, prior to the operation of the welding device, after the LabVIEW program of the vision module 150 is executed, the welding device is operated (S110).

Next, the IR thermal camera 140 connected to the infrared vision module captures the thermal image of the welding part in real time, converts the image into a video signal which can be processed by the PC, and transmits the image to the vision module (S120).

Next, the vision module 150 executes the vision processing on the basis of the received video signal in accordance with a predetermined automation algorithm to detect whether or not slag is generated (S130).

At this time, the vision processing analyzes the video signal captured from the IR thermal camera 140 by the predefined LabVIEW program of the vision module, and detects whether or not slag as a defect of the welding part occurs. Meanwhile, the procedure of creating and executing the automation control algorithm using the LabVIEW program can be visually checked via the display unit 154 of the vision module, and when the occurrence of slag is detected by the vision processing, this can also be checked through the display unit.

Further, the IR thermal camera continues to photograph the entire processes of the welding situation of the welding part, and transmits the image to the vision module, and the vision module continues to process the video signal received from the camera in real time, and detects the occurrence of slag.

Subsequently, when slag is detected in the process of vision processing of the vision module, the position of the slag is analyzed, and the coordinate value signal is transmitted to the slag removal device 160, and meanwhile, the operation command of the slag removal device is issued (S140).

At this time, since the emitted infrared energy of the nonmetallic fixed type slag generally generated at the time of welding is lower than the metal molten pool, a principle of analyzing the position of the slag by the vision module 150 can detect whether or not slag is generated from the isothermal line of the temperature data measured via the IR thermal camera using such a temperature difference.

Next, the slag removal device 160 receives a slug position coordinate value and a slag removal command from the vision module and operates, thereby removing the slag (S150). At this time, all the components of the slag removal device 160 operate in accordance with the control signal transmitted from the vision module 150.

The slag removal device 160 operating in accordance with the control signal of the vision module may include a slag removal wire 161; and a transfer unit 162 which transfers the slag removal wire, and the transfer unit is configured so as to be able to adjust the angle of the slag removal wire and adjust the position according to the horizontal vertical movement.

The slag removal principle of the slag removal device 160 will be described below with reference to FIG. 5.

Generally, since the welding speed and welding rate of the MIG welding device are high, when slag is generated, the welding speed is also fast. In this way, when slag is generated at the time of welding, the molten pool is rapidly solidified, and slag is rapidly fixed on the bead. Therefore, in the present invention, by the slag removal device 160 automatically controlled by the vision module 150, the slag can be removed before it is completely fixed on the beads.

To this end, referring to FIG. 5, when the occurrence of slug 1 is detected in the procedure of vision processing of the vision module 150, the vision module analyzes the position coordinate value of the slag, and issues the operation command to the slag removal device 160.

Next, referring to FIG. 6, the wire transfer unit 162 of the slag removal device receiving the slag position coordinate values transfers the slag wire 161 to the slag occurrence position, and the slag removal wire 161 disposed on the transfer unit comes into contact with the slag 1.

On the other hand, referring to FIG. 5, the bead region of the bead of the welding part may be divided into a low-temperature region A which is completely fused to the base metal M as the time elapses after the welding, a high-temperature region B having fluidity for a while soon after the welding progresses, and a super-high temperature region C in the melting state in which welding is currently in progress. At this time, when the slag 1 is generated in the super-high temperature region C in which the welding is performed, the slag 1 has a property of being pulled to the high-temperature region B having fluidity and lower temperature than the super-high temperature region C and being fused on the high-temperature region B while the high-temperature region B is solidified.

Therefore, in the present invention, as described above, in order to prevent fixation of the slag 1 while the high-temperature region B of the beads is solidified, it is possible to remove the slag by the slag removal device 160 and the flow rate adjustment of the protective gas.

In the welding protective gas flow rate adjustment, by a method of controlling the valve of the gas container 122 connected to the nozzle 131 of the torch, etc, when the vision module 150 detects the slag, a command of increasing the flow rate of the welding protection gas flow rate may be transmitted to the welding power supply 110 to increase the flow rate of the welding protective gas as illustrated in FIG. 6.

Meanwhile, the flow rate adjustment of the welding protective gas is not limited to a method of controlling the valve of the gas container 122. For example, a flow rate adjusting device for changing the flow rate injected to the nozzle 131 of the torch is further disposed, and the flow control device may be configured to be controlled by the vision module 150 of the present invention.

In this manner, when the program of the vision module 150 detects the molten pool of the base material M, more specifically, the generation of the slag 1 in the super-high temperature region C as illustrated in FIG. 6, the flow rate of the protective gas is increased from the nozzle 131 of the torch connected to the vision module to activate the flow of the slag on the super-high temperature region C.

That is, the slag removal wire 161 being in contact with the slag moves in the welding direction together with the welding torch 130 up to the time point at which the welding of the base metal M is completed, and before the molten pool of the welding part is solidified and the slag is completely fused on the bead, that is, before the slag flowing on the molten pool is fixed, the slag removal wire 161 pulls the slag to transfer the slag in the welding direction.

On the other hand, referring to FIG. 7, at the time point when the welding operation of the base material M is completed, the slag removal wire 161 is further transferred from the welding end portion, and pulls the slag on the molten pool up to the welding end portion, and the slag is not fixed onto the bead in the middle of welding, and is fixed to the end portion of the base material M which is the time point at which the welding is finished, thereby facilitating the removal operation.

On the other hand, as illustrated in FIG. 7, removal of slag fixed to the welding part end portion of the base material M may be detached from the bead in a state of being attached to the slag removal wire 161. That is, the wire 161 of the slag removal device moves and is attached to the slag 1 detected via the vision module, and simultaneously increases the flow rate of the protective gas to activate the slag flow on the molten pool, continuously draws the slag up to the time point at which the fixed slag is not dispersed and the welding of the base metal M is finished, and finally pushes and drops the slag.

On the other hand, the slag 1 may not be dragged by the slag removal wire 161 at the time point of end of the welding but may be fixed to the end portion of the base material M. However, since the slag 1 generated by the welding device 100 of the present invention is fixed to the welding end portion of the base material M, the slag may be easily removed even if only minute impacts such as minute impact or air jet is applied. In this way, the welding device 100 of the present invention includes the slag removal wire 161, the slag removal wire 161 of the slag removal device moves in the welding direction up to the base material M end portion in which welding is finished to automate the removal of slag, defective welding is removed, and welding efficiency and productivity are improved.

On the other hand, referring to FIG. 9, the wire can remove not only slag generated on the surface of the molten pool but also slag in the molten pool. FIG. 9 is another example of FIG. 6, illustrating an example in which slag is generated in the molten pool.

In this way, according to the present invention, even if slag is generated in the molten pool, since the position of the slag removal wire 161 of the slag removal device 160 can be adjusted by the transfer unit 162, the slag removal wire 161 is partially charged into the molten pool and is attached to the slag 1 and agglomerated, which can be removed at the time of the end of the welding as in FIG. 7, as described above.

As described above, the welding device 100 according to the present invention can detect whether the slag is generated through the IR thermal camera 140 in real time, using the fact that the temperature of the slag generated during welding is lower than that of the high-temperature metal molten pool, and analyze the position coordinate value of the detected slug through the vision module 150, and can remove the generated slag before it is solidified on the molten pool, by associating this with the slag removal device 160.

The conventional welding failure inspection is an inefficient method of checking and removing the slag completely fixed on the beads after completion of welding in the post-treatment process one by one. On the other hand, in the present invention, the detection and removal of the slag are performed in real time in the welding process, and stable and automated welding can be performed without interrupting welding, there is an effect in which productivity is remarkably enhanced.

Embodiments of the present invention have been described with reference to the accompanying drawings above. However, those having ordinary knowledge in the technical field to which the present invention belongs will appreciate that the invention can be implemented in other concrete forms without changing the technical idea or essential features. It is therefore to be understood that the above-described embodiments are illustrative in all aspects and not restrictive.

EXPLANATION OF REFERENCE NUMERALS 1 slag
100 welding device
110 welding power supply
120 wire feeder
122 gas container
125 wire
130 torch
140 camera
150 vision module
160 slag removal device

The invention claimed is:

1. A welding device comprising:
a welding power source provided with a power supply circuit;
a wire feeder connected to the welding power source to supply wire;
a torch which pulls the wire supplied from the wire feeder and supplies the wire to generate a high-temperature metal molten pool on a welding part;
an IR (infra red) thermal camera which captures an image showing temperature differences of the welding part;
a vision module having built-in program which receives and processes the captured image of the IR thermal camera; and
a slag removal wire which attaches to and removes detected slag located in or on the high-temperature metal molten pool on the welding part in real time utilizing the process result of the vision module, prior to the detected slag becoming attached on the welding part.

2. The welding device of claim 1, wherein the vision module comprises:
an input unit for inputting operator's instructions;
a memory unit which stores a graphical program with computer-readable instructions, the computer-readable instructions including an automation control algorithm;
a CPU configured to access the memory unit and perform the computer-readable instructions which cause the CPU to receive a video signal captured by the IR thermal camera and execute a vision process by the graphical program;
a display unit which visually checks a procedure of creating and executing the automation control algorithm using the graphical program; and
an interface unit which is connected to the IR thermal camera and the slag removal device to transmit a video signal and a control signal.

3. The welding device of claim 1, wherein the slag removal device comprises:
a slag removal wire; and
a transfer unit which transfers the slag removal wire, and the transfer unit adjusts an angle and a position of the slag removal wire to stay in an immediate vicinity of the torch and remove the detected slag.

4. The welding device of claim 1, wherein the torch comprises a nozzle in which a flow rate of welding protective gas is controlled by the vision module.

5. The welding device of claim 3, wherein the torch includes a nozzle in which a flow rate of welding protective gas is controlled by the vision module in order to activate a flow of the detected slag within the immediate vicinity of the torch, the immediate vicinity of the torch including a high temperature or a super-high temperature range caused by the torch.

6. The welding device of claim 2, wherein the graphical program is a built-in LabVIEW program.

* * * * *